Dec. 30, 1930. J. C. SAVAGE 1,787,397
APPARATUS FOR DISSEMINATING MATERIAL IN
FINELY DIVIDED OR POWDEROUS FORM
Filed Feb. 6, 1929 4 Sheets-Sheet 3
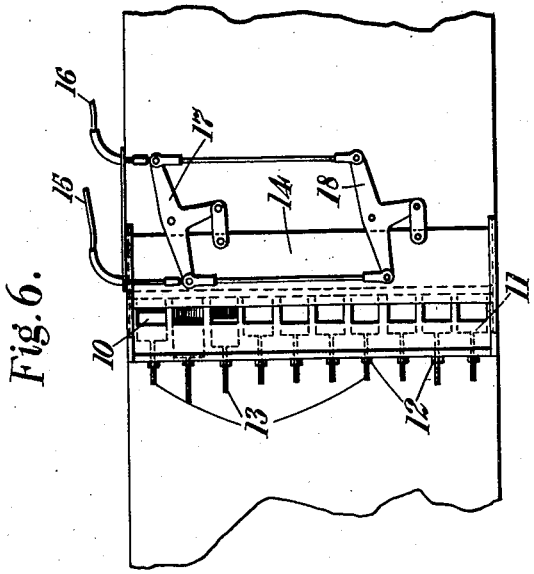
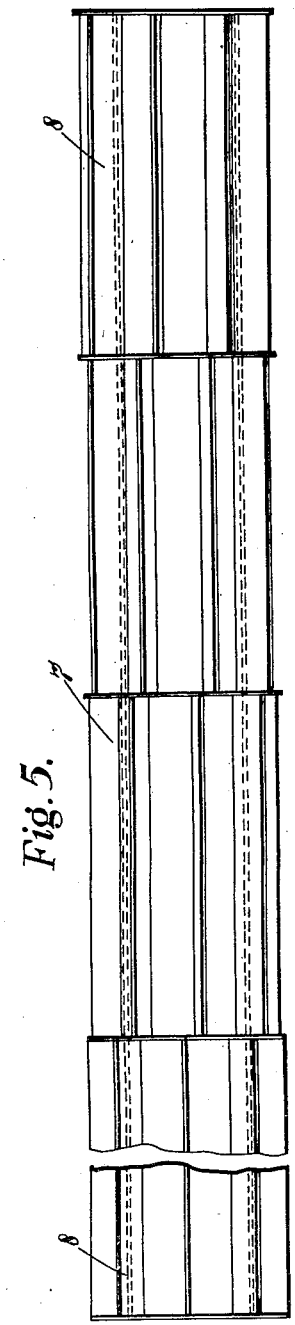
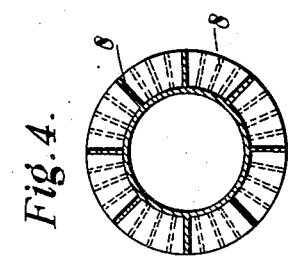

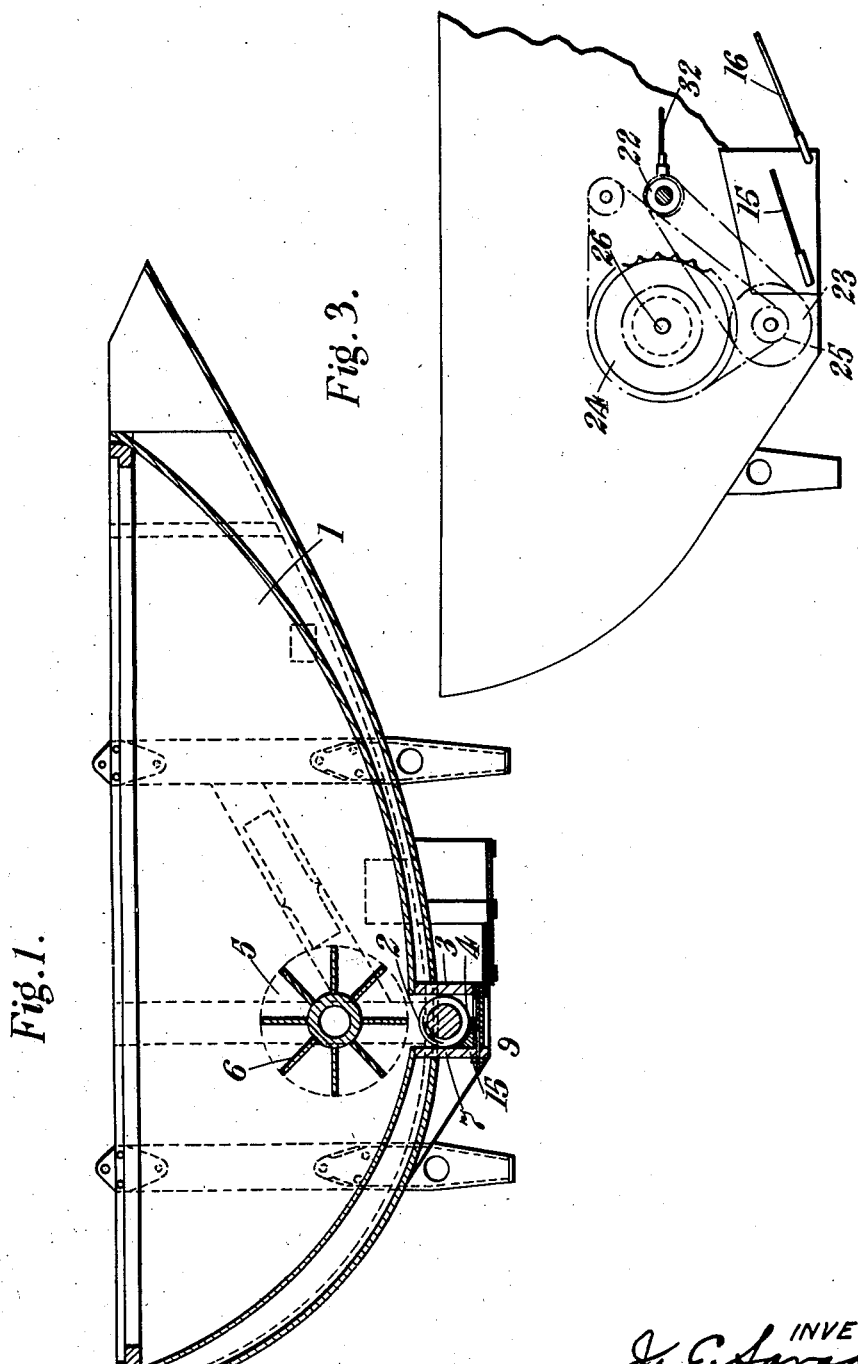

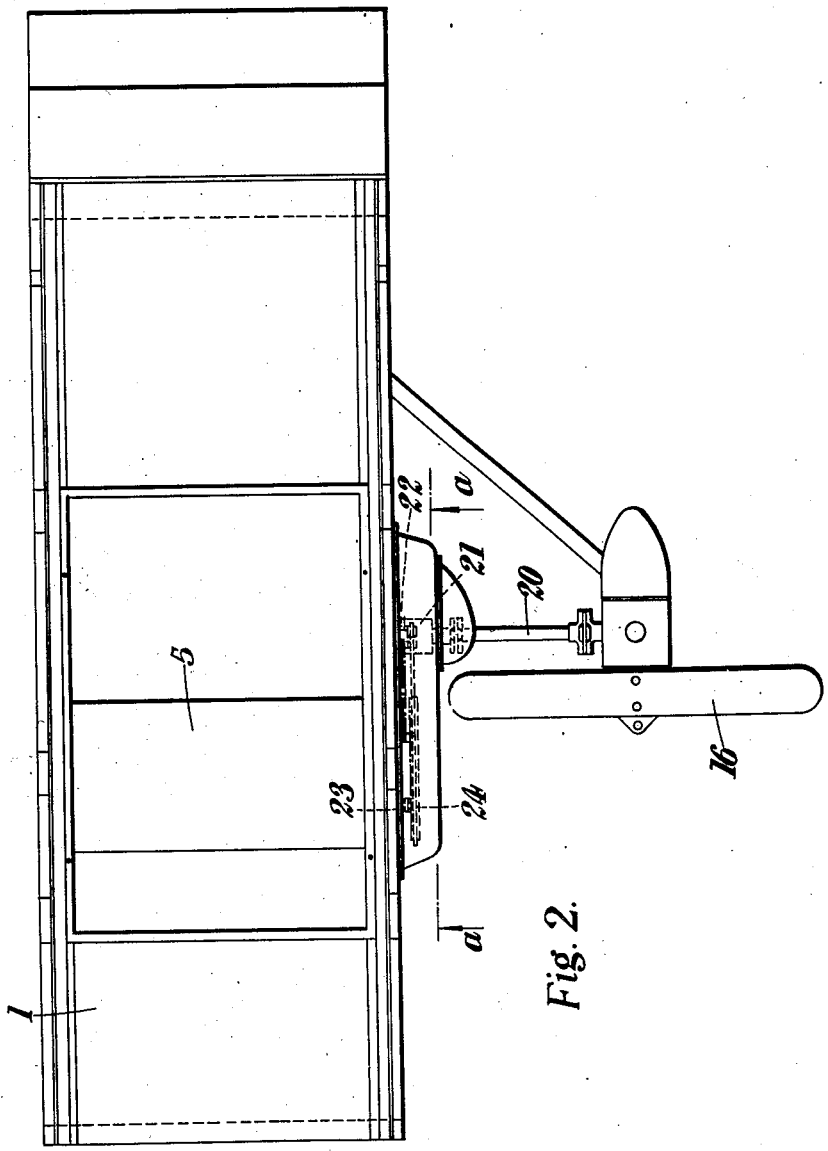

Dec. 30, 1930. J. C. SAVAGE 1,787,397
APPARATUS FOR DISSEMINATING MATERIAL IN
FINELY DIVIDED OR POWDEROUS FORM
Filed Feb. 6, 1929 4 Sheets-Sheet 4
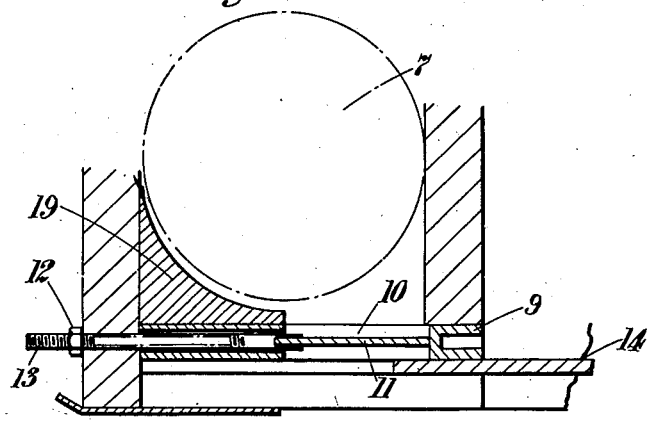
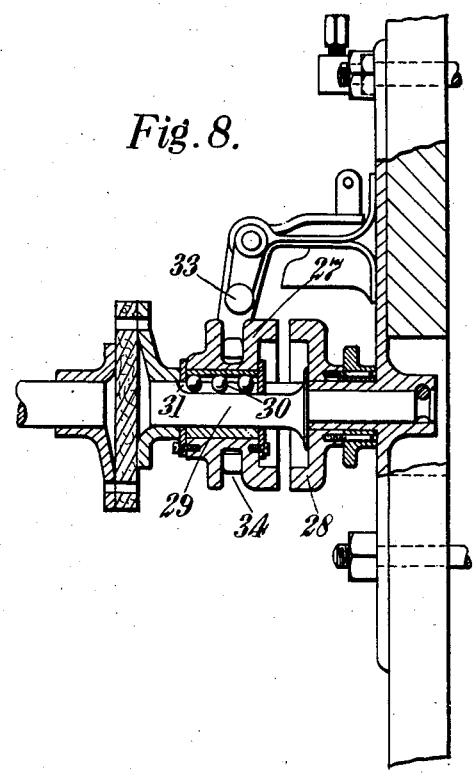
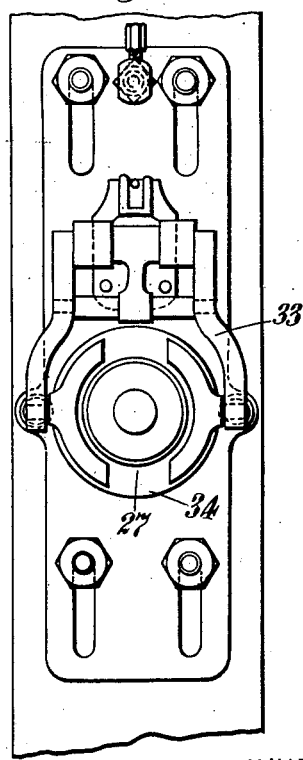
INVENTOR
J. C. Savage
BY Langner, Parry, Card & Langner
ATTORNEYS Patented Dec. 30, 1930

1,787,397

UNITED STATES PATENT OFFICE

JOHN CLIFFORD SAVAGE, OF LONDON, ENGLAND

APPARATUS FOR DISSEMINATING MATERIAL IN FINELY-DIVIDED OR POWDEROUS FORM

Application filed February 6, 1929, Serial No. 337,934, and in Great Britain February 11, 1928.

The present invention relates to apparatus for disseminating material in finely divided or powderous form and has more particular reference to apparatus for disseminating material in finely divided or powderous form from the air over relatively wide areas for example for the purpose of poisoning locusts or other objectionable insects or pests, treating growing plants or the like.

The chief object of the present invention is to provide an improved apparatus for this purpose of such a nature that clogging of the material in the apparatus is effectively prevented and a free flow of the material from the apparatus when desired is ensured.

A further object of the invention is to provide an apparatus for disseminating material in finely divided or powderous form over relatively large areas which may be set in advance to give variable rates of delivery of the material and in which the actual rate of delivery of the material may be regulated in such a manner that the quantity of material disseminated per unit area is maintained substantially constant this feature being of especial importance when the material is disseminated from an aircraft for the purpose of poisoning locusts treating growing plants or the like.

In order that the above and other features of my invention may be clearly understood and readily carried into effect reference may now be had to the accompanying drawings illustrating a preferred embodiment thereof by way of example and in which:—

Figure 1 is a longitudinal sectional view of apparatus in accordance with the invention;

Figure 2 is a plan view of apparatus according to the invention;

Figure 3 is an elevational view on the line a—a of Figure 2 with the cover removed;

Figure 4 is a sectional view of the feeding or volumetric measuring device shown diagrammatically in Figure 1;

Figure 5 is an elevational view of the device shown in Figure 4;

Figure 6 is a plan view from the under side of the discharge throat of the receptacle shown in Figure 1;

Figure 7 is an enlarged sectional view of the discharge throat of the receptacle;

Figure 8 is a sectional view of a preferred form of clutch used according to the invention; and Figure 9 is an elevational view of the clutch shown in Figure 8.

Referring first to Figures 1 and 2 of the drawings the reference numeral 1 represents a receptacle adapted to hold a quantity of material in finely divided or powderous form having an orifice 2 provided with walls 3 adapted to form a throat or tube-like extension 4 through which the material in the receptacle 1 is adapted to be discharged. The orifice 2 and the associated tube-like extension 4 preferably extend across the whole width of the receptacle 1.

Within the receptacle 1 and preferably positioned directly above the orifice 2 is an agitating device 5 whose function is to prevent the particles of material within the receptacle from packing or binding together and to ensure a free flow of the material through the orifice 2 at all times. The agitating device 5 may conveniently be of the paddle wheel type having radially extending blades 6 as shown.

For the purpose of feeding the material from the receptacle 1 a feeding or volumetric measuring device 7 may be provided in the throat 4. The device 7 may also be of the paddle wheel type having radially extending blades 8 as shown in Figures 4 and 5 and the blades 8 are preferably mounted in sections with the blades of each section arranged to have a slight lead upon the blades of the next adjacent section on the right hand side thereof.

In order to control the discharge of the material from the receptacle 1 I preferably provide across the lower extremity of the throat or tube-like extension 4 a plate 9 having a number of individual apertures 10 of a predetermined size arranged on the side of the throat 4 opposite to that upon which the device 7 tends to deliver the material. Each aperture 10 is adapted to be closed or opened by means of a plate 11 which may, for example, be caused to slide in suitable grooves attached to or forming part of the plate 9 by means of the nuts 12 working in the threaded rods 13. In the particular example shown in Figure 6 the plate 9 has ten apertures but any other convenient number may be used. A plate 14 under the control of an operator is adapted to be moved—by means such for example as Bowden wires 15 and 16 and levers 17–18—to close off or open simultaneously all those apertures 10 through which discharge of the material is permitted by the plates 11.

The feeding or volumetric measuring device 7 preferably is adapted to rotate with small clearance in the throat or tube-like extension 4 depending from the receptacle 1 and a fillet 19 is arranged so as to occupy substantially one half of the cross sectional area of the throat 4 upon the side thereof towards which the feeding device 7 normally tends to deliver the material and is so designed that the small clearance between the device 7 and the walls 3 of the extension or throat 4 is gradually or progressively enlarged towards the opposite side of the throat where the material is discharged. Were the discharge orifice or orifices provided upon the side of the throat occupied in the apparatus of the present invention by the fillet 19 the material would be delivered in a series of small quantities and there would be a tendency when the one or more orifices were partly closed for the material to build up and be compressed into a more or less solid mass which would ultimately prevent rotation of the feeding device. These disadvantages are obviated by the present construction according to which the material is adapted to be delivered in a more or less continuous stream. It will be appreciated that instead of providing a separate fillet as 19 the walls of the throat may be suitably shaped as a guiding means for the same purpose.

In the operation of the apparatus the agitating device 5 and the feeding device 7 should be rotated continuously to effect the discharge of material from the receptacle 1 and any convenient source of power may be employed for this purpose.

When the apparatus is used for the treatment of growing plants or the like occupying a relatively large area by moving it over the area under treatment it is desirable that the rate at which the material is discharged therefrom should be proportional to the speed at which the apparatus is moved over the area under treatment in order that the material may be substantially evenly distributed over said area. Accordingly, I arrange for the rate of discharge of the material to be correlated with the speed of travel of the apparatus and this may be accomplished when the apparatus is mounted upon a vehicle such as an aircraft by driving the agitating device 5 and the feeding means 7 by means of an airscrew or propeller 16 mounted in a convenient position upon the vehicle so as to be actuated by the airstream created thereby.

As shown more especially in Figures 2 and 3 the drive of the propeller 16 may be transmitted by way of a shaft 20 through the clutch 21—such as a dog or other non-slipping clutch—to a gear wheel 22 and from thence to the gear wheels 23 and 24 mounted upon the shafts 25 and 26 of the feeding device 7 and agitating device 5 respectively in any convenient manner such as by chains and sprocket wheels. The relative speeds of agitating means 5 and feeding device 7 are, of course, determined by the size of the sprocket wheels 24 and 25.

By providing the clutch 21 in the drive from the airscrew the latter may be rotated continuously and the clutch 21 engaged only when it is desired to discharge material from the receptacle 1. With such an arrangement the airscrew will supply the necessary initial force to overcome the relatively heavy initial load upon the devices 5 and 7 due primarily to caking of the material in the receptacle in the neighbourhood of the agitating means 5 and feeding device 7.

Preferably the airscrew or propeller 16 is so designed that while it will give a definite number of revolutions at a certain air speed its diameter and area are such that the power available is always in excess of that required whatever the physical properties of the material in the receptacle. Consequently there will be substantially no variation in the volume of material fed from the receptacle 1 at each revolution of the propeller whatever the physical properties of the finely divided or powderous material therein.

In Figures 8 and 9 I have illustrated a form of clutch which is particularly suitable for use in connection with the apparatus hereinbefore described when fitted to an aeroplane. In such circumstances it is preferable that the clutch should be of such a nature that it may be operated with the least possible effort. As shown the clutch comprises a pair of members 27 and 28 having suitable dogs, one member 27 being movable lengthwise of the shaft 29 upon which it is mounted for the purpose of bringing its dogs into and out of engagement with the dogs on the other member 28 by virtue of ball bearings 30 located in suitable grooves 31 in the shaft 29. The member 27 may be moved into engagement with the member 28 by operation of a suitable Bowden wire or other connection 32 operatively connected to the fork elements 33 bearing in a groove 34 in the member 27. If desired the dog faces may be so inclined that the clutch will tend to disengage due to its own rotation.

What I claim is:—

1. Apparatus for disseminating material in a finely divided form comprising a receptacle, a discharge throat depending from said receptacle, a feeding device of paddle wheel form mounted for rotation with small clearance in said throat and means disposed to occupy substantially one half of the cross sectional area of said throat on that side thereof towards which the material tends to be delivered by rotation of said feeding device of such form as to provide a passage for the material the cross sectional area of which progressively enlarges towards the opposite side of the throat where the material is discharged.

2. Apparatus for disseminating material in a finely divided form comprising a receptacle for said material, a discharge throat depending on said receptacle, a feeding device of paddle wheel form mounted for rotation with small clearance in said throat, a plate disposed across said throat having discharge apertures therein, means for closing said apertures independently, and means disposed to occupy substantially one half of the cross sectional area of said throat on that side thereof towards which the material tends to be delivered by rotation of said feeding device of such form as to provide a passage for the material the cross sectional area of which progressively enlarges towards said apertures.

3. Apparatus for disseminating material in a finely divided form as claimed in claim 2, comprising means for controlling simultaneously the discharge of material through all said apertures.

4. Apparatus for disseminating material in a finely divided form comprising a receptacle, a discharge throat depending from said receptacle, a feeding device of paddle wheel form mounted for rotation with small clearance in said throat, means disposed to occupy substantially one half of the cross sectional area of said throat on that side thereof towards which the material tends to be delivered by rotation of said feeding device of such form as to provide a passage for the material the cross sectional area of which progressively enlarges, and means for driving the feeding device at a speed proportional to the speed of travel of the vehicle to which the apparatus is attached.

5. Apparatus for disseminating material in a finely divided form as claimed in claim 4 comprising an airscrew for rotating said feeding device.

6. Apparatus for disseminating material in a finely divided form as claimed in claim 5 comprising an agitating device of paddle wheel form rotatable in said receptacle and means for driving said agitating device from said airscrew.

7. Apparatus for disseminating material in a finely divided form comprising a receptacle for said material, a discharge throat depending from said receptacle, a feeding device of paddle wheel form mounted to rotate with small clearance in said throat, a plate disposed across said throat having a number of discharge apertures, means for independently controlling said apertures, means disposed to occupy substantially one half of the cross sectional area of said throat on that side thereof towards which the material tends to be delivered by rotation of said feeding device of such form as to provide a passage for the material the cross sectional area of which progressively enlarges, an airscrew for causing rotation of said feeding device, and a manually operable clutch device interposed in the drive of said feeding device for the purpose specified.

8. Apparatus for disseminating material in a finely divided form as claimed in claim 7 in which said clutch device comprises a pair of clutch elements one of which is mounted for longitudinal movement upon a shaft by means of ball or like bearings for the purpose specified.

9. The combination with an aircraft of apparatus for disseminating material in a finely divided form comprising a receptacle for said material, a discharge throat depending from said receptacle, a feeding device of paddle wheel form mounted for rotation with small clearance in said throat, means for controlling the mean discharge rate of said material from said receptacle, means under the control of an occupant of said aircraft for stopping and starting the delivery of said material from said receptacle, an airscrew for rotating said feeding device, and clutch means under the control of an occupant of the aircraft interposed in the transmission mechanism between said airscrew and feeding device for the purpose specified.

10. Apparatus for disseminating material in a finely divided form from an aircraft as claimed in claim 9, including an agitating device of paddle wheel form rotatably mounted on said receptacle, and means for driving said agitating device from said airscrew.

In testimony whereof I have signed my name to this specification.

JOHN CLIFFORD SAVAGE.